April 26, 1927.
K. HERGERSHAUSEN
FIGURE OF ANIMATE OBJECTS
Filed Dec. 9, 1925
1,626,533
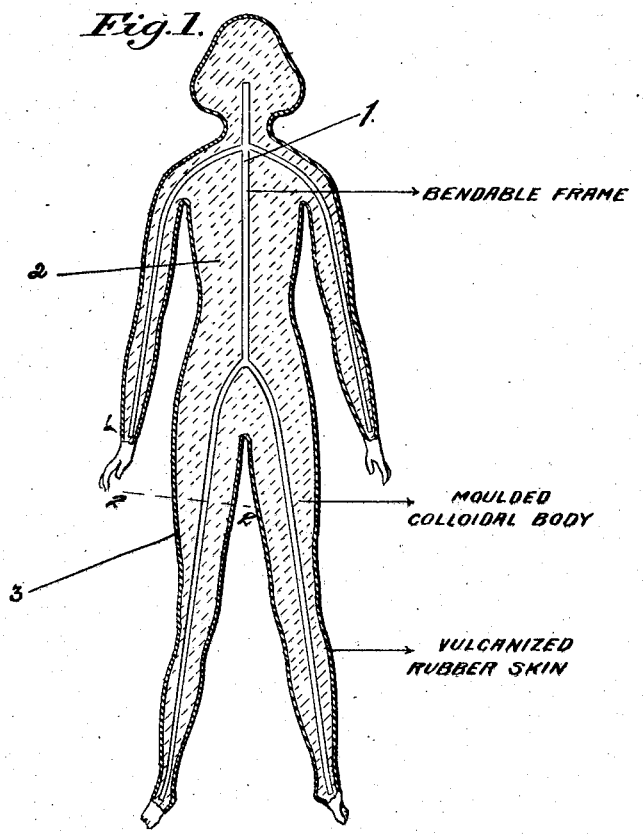
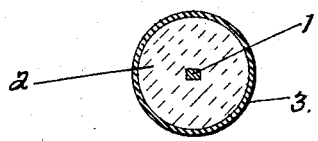
Inventor:
Katharina Hergershausen Patented Apr. 26, 1927.

1,626,533

UNITED STATES PATENT OFFICE.

KATHARINA HERGERSHAUSEN, OF BERLIN, GERMANY, ASSIGNOR TO THE FIRM MITTELLAND GUMMIWERKE AKTIENGESELLSCHAFT, OF HANOVER-LINDEN, GERMANY.

FIGURE OF ANIMATE OBJECTS.

Application filed December 9, 1925, Serial No. 74,407, and in Germany December 12, 1924.

This invention relates to figures of animate objects such as dolls or the like moulded from colloidal flexible masses, whereby the surfaces of such figures are rendered firmer and more resistant to atmospheric conditions than has hitherto been the case.

It is known to produce moulded flexible figures, for instance, dolls, from colloidal substances such as glue or gelatine, vegetable mucilaginous substances and the like with the aid of glycerine or oily or basamic, natural or artificial substances and to render their surfaces more firm by means of agents, which have hardening, for instance, tanning effects, such as formaldehyde, chromates, tannin and analogous substances. Such figures, which can be coloured or shaded as desired, would have a very large application if their surfaces were not impaired by atmospheric conditions and if they did not have an unpleasant cold and lifeless touch.

The invention is illustrated by the accompanying drawing in which:

Fig. 1 is a vertical section through a doll embodying the principle of the invention.

Fig. 2 is a cross section taken along the line 2—2 of Figure 1.

Referring now in detail to the several figures, the reference character 1 represents a bendable frame about which is moulded the colloidal body 2, said body being surrounded by a rubber skin or coating 3.

It has also been proposed to construct golf or other balls with cores of colloidal material such as gelatine, afterwards dipping the moulded balls into a rubber solution.

According to this invention figures such as dolls or the like moulded from colloidal flexible masses are provided with a coating of rubber or similar material which enables them to resist the action of the atmosphere and the effects of moisture, dryness, acids and the like, but allows of their being washed.

The rubber coating is supplied from a solution or semi-solution of rubber or similar material or from the crude or concentrated latex of rubber or similar materials.

As solvents for the rubber, benzine, benzol, carbon bisulphide and the like may be used and small quantities of alcohol are advantageously admixed with the same. The moulded figures may, without preliminary treatment, be dipped into crude or concentrated rubber latex. In the latter case an especially favourable and firmly adhering coating is obtained if salt solutions for coagulating the rubber are applied to the latex coating.

After the coatings have been attached, they may then be coloured and vulcanized.

In some cases, such as with dolls, the figures are provided with wire cores or with inserted joints which may be cast initially into the figures and which enable the finished articles to be given definite positions or postures. Since the rubber coating is elastic, it accommodates itself to the various positions or postures.

Having now particularly described and ascertained the nature of my said invention and in what manner the same is to be performed, I declare that what I claim is:—

1. In combination a figure of an animate object comprising a moulded core of gelatinous material, a flexible framework embedded therein with which said gelatinous material makes homogenous contact and capable of assuming a "set" when bent and a coat of flexible rubber covering the surface of the gelatinous material.

2. In combination a figure of an animate object comprising a moulded core of gelatinous material, a flexible framework embedded therein with which said gelatinous material makes homogenous contact and capable of assuming a "set" when bent and a coat of flexible vulcanized rubber covering the surface of the gelatinous material.

In testimony whereof I have signed my name to this specification.

KATHARINA HERGERSHAUSEN.